CHARLES L. PORTER
INVENTOR.

Feb. 3, 1948.  C. L. PORTER  2,435,235
CONTINUOUS VACUUM FILTER
Filed Oct. 28, 1944  2 Sheets-Sheet 2

CHARLES L. PORTER
INVENTOR.

BY
W. A. McGrew
ATTORNEY

Patented Feb. 3, 1948

2,435,235

UNITED STATES PATENT OFFICE 2,435,235

CONTINUOUS VACUUM FILTER

Charles L. Porter, Carlsbad, N. Mex.

Application October 28, 1944, Serial No. 560,730

6 Claims. (Cl. 210—199)

My invention relates to continuous vacuum filters of the rotary drum type and particularly to arrangements for controlling the flow of compressed air to facilitate the release of filter cake from the drum.

The continuous rotary vacuum filter is widely used for filtering operations such as are necessary in the purification or concentration of ores and similar compositions. These filters are particularly useful for processes which require a washing operation with clear water following the initial removal of filtrate. The filter drum of these rotary filters is divided into a plurality of independent filter compartments and each compartment is connected alternately to a vacuum pump and to a compressed air supply, the vacuum collecting a filter cake as the drum rotates through a tank containing pulp and the filter cake being removed by a blast of compressed air after the filtrate has been drawn from it.

The valve control for effecting the various air circuit connections is conventionally arranged on one of the trunnions of the drum, and comprises a rotary disk valve arranged to connect each compartment in turn to the vacuum pump and later to the compressed air supply. Both the low pressure of the vacuum line and the high pressure of the compressed air line are handled by this same valve, and difficulties arise in maintaining these valves in continuous service. For this reason and to secure economical use of the compressed air the length of time during which the valve is subject to the high pressure of the compressed air line has been reduced by providing a spring biased valve in the air supply line and by actuating this valve intermittently to supply compressed air to the main valve only when it is required for the air blasting operation. The life of the main control valve is thereby prolonged but these spring biased valves have not been entirely satisfactory.

Accordingly it is an object of my invention to provide in a filter of the rotary continuous vacuum type an improved arrangement for controlling the supply of compressed air for facilitating the removal of the filter cake.

Further objects and novel features of my invention will become apparent as this description proceeds and the features of novelty which characterize my invention will be pointed out with particularity in the appended claims.

For an understanding of my invention reference may be had to the following description taken in connection with the accompanying drawings in which.

Figure 1:
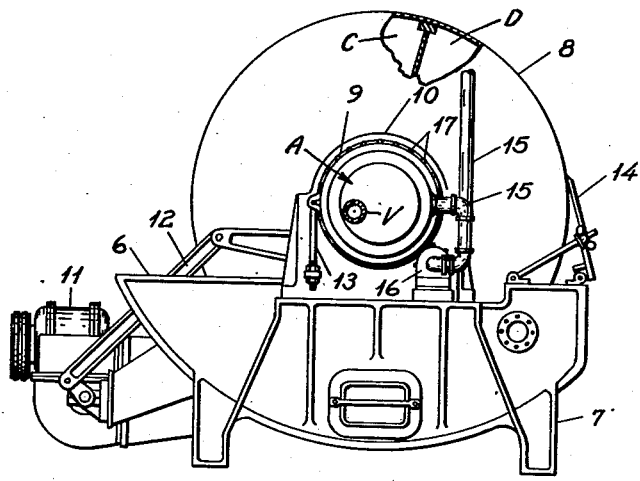
Fig. 1 is an end elevation view of a rotary filter embodying my invention.
Figure 2:
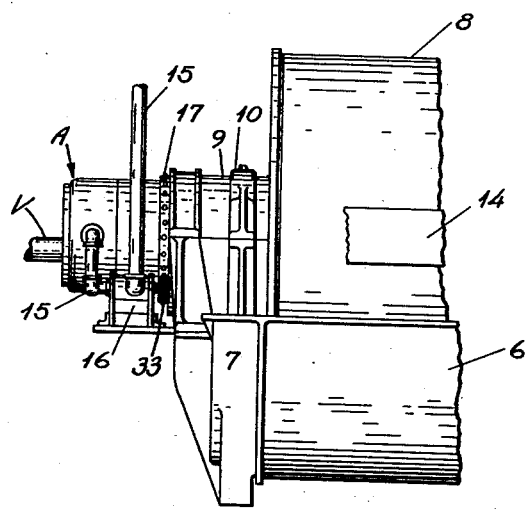
Fig. 2 is a side elevation view of one end of the filter of Fig. 1.

Referring now to the drawing, the filter illustrated in Figs. 1 and 2 comprises a tank 6 provided with supporting ends 7, only one of which is shown on the drawing. A filter drum 8 is rotatably mounted on a horizontal axis so that it may be maintained partly immersed in a body of pulp in the tank 6. Each end of the drum is provided with a trunnion 9 journaled in a bearing 10 as shown at the end 7. The drum is driven by an electric motor 11 through a suitable transmission mechanism (not shown) so that it rotates in the clockwise direction as viewed in Fig. 1. The motor also drives a link mechanism 12 for rocking an agitator (not shown) arranged near the bottom of the tank 6 below the drum.

Continuous filters of this type, as is well known in the art, are provided with a plurality of independent filter compartments as "C" and "D" arranged in succession about the circumference of the drum and covered with filter screens. As the drum rotates each compartment passes through the pulp in the tank while a rotary automatic control valve connects the compartment to a vacuum pump so that a filter cake is collected on the screen. The vacuum is maintained so that the filtrate is drawn from the cake after the cake has emerged from the pulp, and if desirable, wash water is sprayed over the cake. Then the vacuum is shut off as the cake descends on the far side of the drum and a blast of compressed air is admitted to loosen the filter cake from the screen.

The details of the construction and arrangement of the filter compartments and of the vacuum pump and automatic control valve have not been illustrated as they are not necessary to an understanding of the present invention. The rotary automatic control valve for connecting the compartments successively to the vacuum pump line "V" and compressed air supply line is arranged at the end of the trunnion 9 and is generally indicated by the letter "A." This valve is provided with a control arm 13 to select the positions of the drum at which each compartment is connected and disconnected to the vacuum pump and connected to and disconnected from the compressed air supply line.

The filter cake which has been loosened by the blast of compressed air moves on the downwardly rotating side of the drum against a scraper 14 which removes the cake from the filter screen and allows it to fall on a suitable conveyor or other receptacle (not shown).

In order to reduce the required capacity of the compressed air supply system and to avoid difficulties which have arisen when the automatic control valve is subject to full air pressure throughout the operation of the filter, a separate valve may be provided in the compressed air line, this valve being synchronized with the automatic control valve to admit compressed air to the automatic control only when a compartment is in position to receive the blast of compressed air.

In the filter illustrated, compressed air is conducted to the interior of the trunnions through a supply line 15, and a control valve 16 is provided to admit the compressed air only at predetermined times. Heretofore, valves biased to their closed position have been employed in the compressed air supply line, the valves being engaged successively and opened by equally spaced arms or projections on the trunnions such as indicated at 17 on the drawing. While these valves have avoided most of the difficulties caused by the constant presence of compressed air at the automatic control valve, they have been subject to variable performance, and have required considerable attention and servicing with resultant shut-downs in order to maintain the filter in operation.

Figure 3:
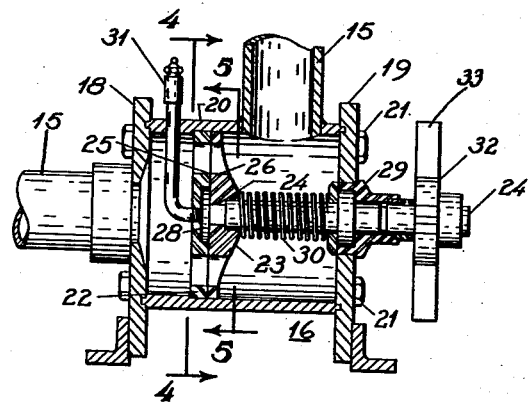
Fig. 3 is an enlarged sectional side elevation of the compressed air valve employed with the filter of Fig. 1.
Figure 4:
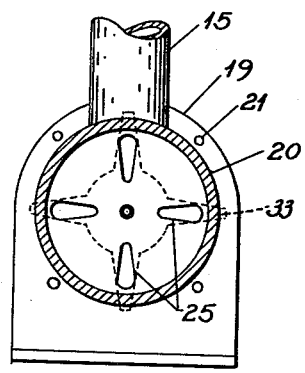
Fig. 4 is a sectional view on the line 4—4 of Fig. 3.
Figure 5:
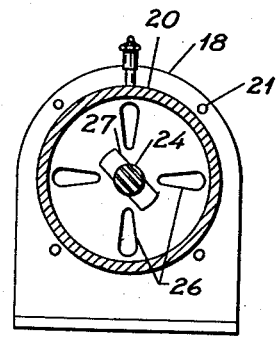
Fig. 5 is a sectional view on the line 5—5 of Fig. 3.

The valve 16, as shown in Figs. 3, 4 and 5 is a rotary type valve having a casing comprising end plates 18 and 19 and a cylindrical shell 20 secured together by four longitudinal bolts 21 extending between the end plates outside the shell. A stationary transverse partition plate 22 is secured within the shell 20 and a complementary rotatable plate 23 is mounted on a shaft 24 in face engagemenet with the plate 22. The plates 22 and 23 are provided with corresponding radially extending elongated openings 25 and 26, respectively; these openings being spaced at equal angles circumferentially of the plates. The plate 23 is slidable axially on the shaft 24 toward plate 22 but is keyed against rotation on the shaft by a key 27 formed on the shaft and fitting a slot in the plate.

The end of the shaft within the casing is mounted in a suitable bearing assembly 28 in a recess in the plate 22 and the driven end of the shaft is mounted in a main ball bearing assembly 29 in the end plate 19 of the valve casing. The valve plates 22 and 23 are maintained in sealing engagement by a compression spring 30 surmounting the shaft 24 and engaging the disk 23 and the bearing cover on the plate 19. The engaging faces of the plates 22 and 23 may be lubricated through a pressure connection 31 extending outside the shell 20 and arranged to conduct lubricant through the center of the plate 22 to the bearing 28 and the engaging surfaces between the plates.

The valve 16 has been shown with four equally spaced openings in each of the plates 22 and 23 so that the valve is opened once every quarter revolution of the shaft 24. In order to actuate the valve a four armed star wheel 32 is provided with its arms 33 in alinement with the openings 26 in the plate 23.

The valve 16 is mounted on the end support 7 adjacent the trunnions so that the driving arms 33 of the valve are in the path of the projections 17 on the trunnion. The arms 33 and the projections 17 are so arranged that each projection 17 when passing the wheel 32 engages an arm 33 and rotates the wheel through one quarter of a turn bringing the next arm 33 in position to be engaged by the next projection 17. The projections are set so that the wheel 32 is turned to open the valve 16 only when a filter compartment is in position to receive a blast of compressed air, the projections being adjusted with reference to the automatic control valve in the trunnions so that they strike the star wheel 32 and move it to open the valve only when the automatic valve has shut off the vacuum pump connection. The details of the arrangement for adjusting the positions of the series of projections 17 have not been illustrated in order to avoid complication of the drawing.

The valve 16 is uniform in operation and provides an effective seal to prevent the admission of compressed air to the automatic control valve except when a blast is required. In this connection it will be noted that the air under pressure and entering the shell 20 from the top portion of the line 15 holds the valve plate 23 against the plate 22 when the valve is closed. On each movement of the star wheel the valve is open for the same length of time and there is substantially no variation in the blasts of air; this uniformity is insured since the speed of the drum is constant and hence the speed of movement of the valve 16 is consistently the same on each quarter rotation of the star wheel.

During the operation of the filter illustrated the tank 6 is continuously supplied with the pulp to be filtered, and the drum 8 is rotated at a selected constant speed. The automatic control valve is set to determine the portions of each revolution of the drum during which the individual compartments are to be under vacuum and also when they are to receive the blast of air for loosening the filter cake. The position of the series of projections 17 is then set to correspond with the time selected for the air blast and the valve 16 is adjusted so that it is closed when the star wheel is not engaging a projection 17. As the drum rotates a filter cake is formed on each compartment under vacuum, and then as the filter compartment moves toward its position for release, one of the projections 17 engages the star wheel 32 and turns it through a quarter of a revolution to admit a blast of air at the selected time. This loosens the filter cake from the screen and thereafter the cake is removed from the drum upon passing the scraper 14.

Obviously the positions of the projections 17 may be selected to open the valve 16 at the desired time regardless of the time required to effect the complete quarter turn of the star wheel; it being evident that the valve is open during only a portion of the quarter turn of the star wheel, and that this portion of the turn is adjusted to occur when the blast is required.

It is readily apparent from the foregoing that I have provided a simple and rugged arrangement for insuring efficient operation of a continuous rotary drum filter and for insuring uniform and consistent operation of the compressed air blast for loosening the filter cake.

While I have described my invention in connection with a particular type of rotary drum continuous vacuum filter, other applications will readily be apparent to those skilled in the art. I do not, therefore, desire my invention to be limited to the particular construction illustrated and described, and I intend by the appended claims to cover all modifications which fall within the spirit and scope of my invention.

What I claim and desire to secure by Letters Patent is:

1. The combination with a continuous vacuum type filtering apparatus having a rotary drum provided with a plurality of filter compartments, and with which is associated control means for alternately connecting a vacuum conduit and an air pressure conduit with a filter compartment, of valve means for controlling flow through the air pressure conduit and comprising a rotatable valve member having conduit flow open and closed positions; means for moving the valve member to open and closed positions; and means mounted on said drum for actuating said moving means upon rotation of said drum, said valve member being moved to open position each time said air pressure conduit is connected to a filter compartment by said control means.

2. The combination with a continuous vacuum type filtering apparatus having a rotary drum provided with a plurality of filter compartments, and with which is associated control means for alternately connecting a vacuum conduit and an air pressure conduit with a filter compartment, of valve means for controlling flow through the air pressure conduit and comprising a stationary member and a rotatable member having complementary ports arranged to register at equal angular rotative movements of the rotatable member and thereby open said valve to permit air under pressure to pass through said conduit to said control means; means for rotating the rotatable valve member intermittently through non-registering positions, in which the flow of air to said control means is prevented; and means mounted on said drum and rotatable therewith for actuating said rotating means.

3. The combination with a continuous vacuum type filtering apparatus having a rotary drum provided with a plurality of filter compartments and with which is associated a control means for alternately connecting a vacuum conduit and an air pressure conduit with a filter compartment, of valve means for controlling flow through the air pressure conduit and comprising a stationary member having a plurality of circumferentially spaced radial ports and a rotary member having a plurality of similar complementary ports, said ports when in coinciding relation permitting flow through the air pressure conduit to said control means, a star wheel connected to the rotatable valve member and having arms corresponding in position and number to the ports, and circumferentially spaced actuating members connected to the drum for rotation with the drum about the drum axis for turning said star wheel and placing the ports in coinciding relation each time the drum rotates through a predetermined angle.

4. The combination with a continuous vacuum type filtering apparatus having a rotary drum mounted on trunnions and provided with a plurality of filter compartments with which is associated control means for alternately connecting a vacuum conduit and an air pressure conduit with a filter compartment, of valve means for controlling flow through the air pressure conduit and comprising a stationary valve member and a rotatable valve member each having equally spaced circumferentially positioned ports which register each time the rotatable member is turned through a predetermined angle, said ports when registering permitting flow through said air conduit to said control means, a driving member connected to the rotatable member and having equally spaced radially extending actuating elements, and projections on the trunnion for cooperative engagement with the elements, said projections on the trunnions being so circumferentially spaced that a projection will engage an element and move the ports to register when the drum rotates through a predetermined angle, said registering positions of the ports occurring when the control means connects the air pressure conduit to a filter compartment.

5. The combination with a continuous vacuum type filtering apparatus having a rotary drum provided with a plurality of filter compartments and with which is associated a control means for alternately connecting a vacuum conduit and an air pressure conduit with a filter compartment, of valve means for controlling flow through the air pressure conduit and comprising a stationary member and a rotatable member having complementary ports arranged to register to place said valve in open position at equally spaced angular positions throughout the rotation of said rotatable member, means, including a compression spring, for maintaining said members in sealing engagement, and means including actuating members connected to rotate with said drum for intermittently turning said rotatable member through the angle between adjacent ones of said angular positions to move said valve to open position and thereby admit compressed air through said air pressure conduit to said control means for each predetermined position in the rotation of said drum.

6. Valve means for association with an air pressure conduit of a continuous vacuum type filtering apparatus having a rotary drum provided with a plurality of filter compartments and with which is employed a control means for alternately connecting a vacuum conduit and the said air pressure conduit with a filter compartment, said valve means being positioned in the air pressure conduit ahead of the control means and comprising a stationary member having a plurality of circumferentially spaced ports and a rotary member having a plurality of similar complementary ports, said ports when in registering relation permitting flow through the air pressure conduit, circumferentially spaced actuating elements mounted for rotation with the drum, an actuating member connected to the rotatable valve member and having arms corresponding in position and number to the ports and adapted to be arranged for cooperation with the actuating elements so that the rotary member is periodically moved and the ports placed in register as the drum rotates.

CHARLES L. PORTER.

REFERENCES CITED

The following references are of record in the file of this patent:

UNITED STATES PATENTS

| Number | Name | Date |
|---|---|---|
| 1,917,818 | Woodworth | July 11, 1933 |
| 2,352,330 | Lee | June 27, 1944 |
| 1,835,796 | McCaskell | Dec. 8, 1931 |